June 5, 1928.
G. D. SUNDSTRAND
LATHE
Filed Sept. 28, 1922
4 Sheets-Sheet 1
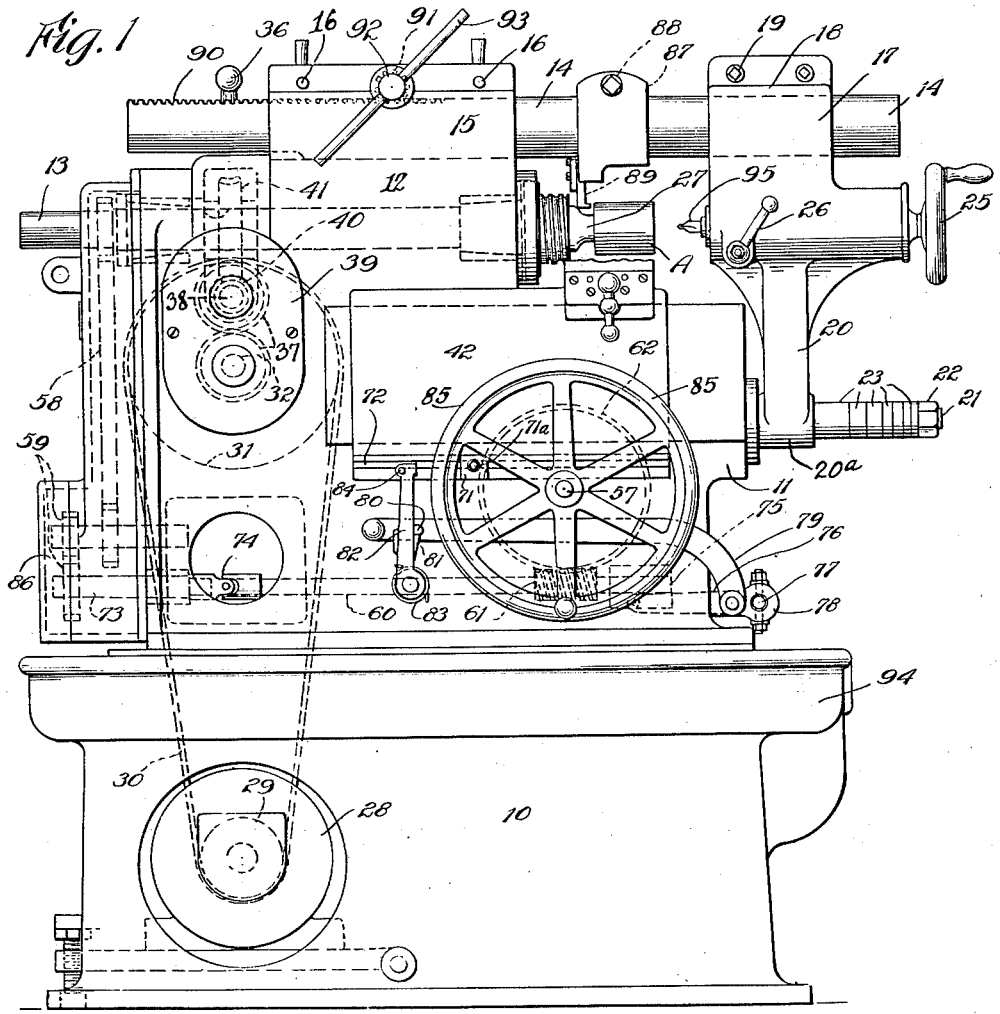

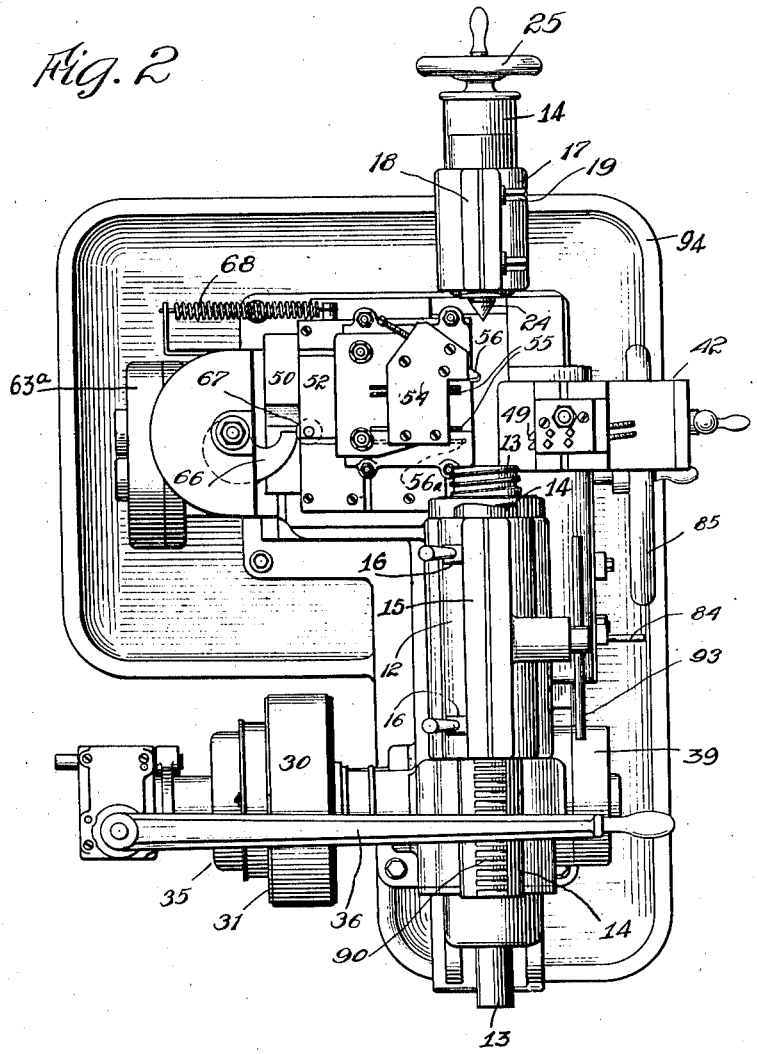

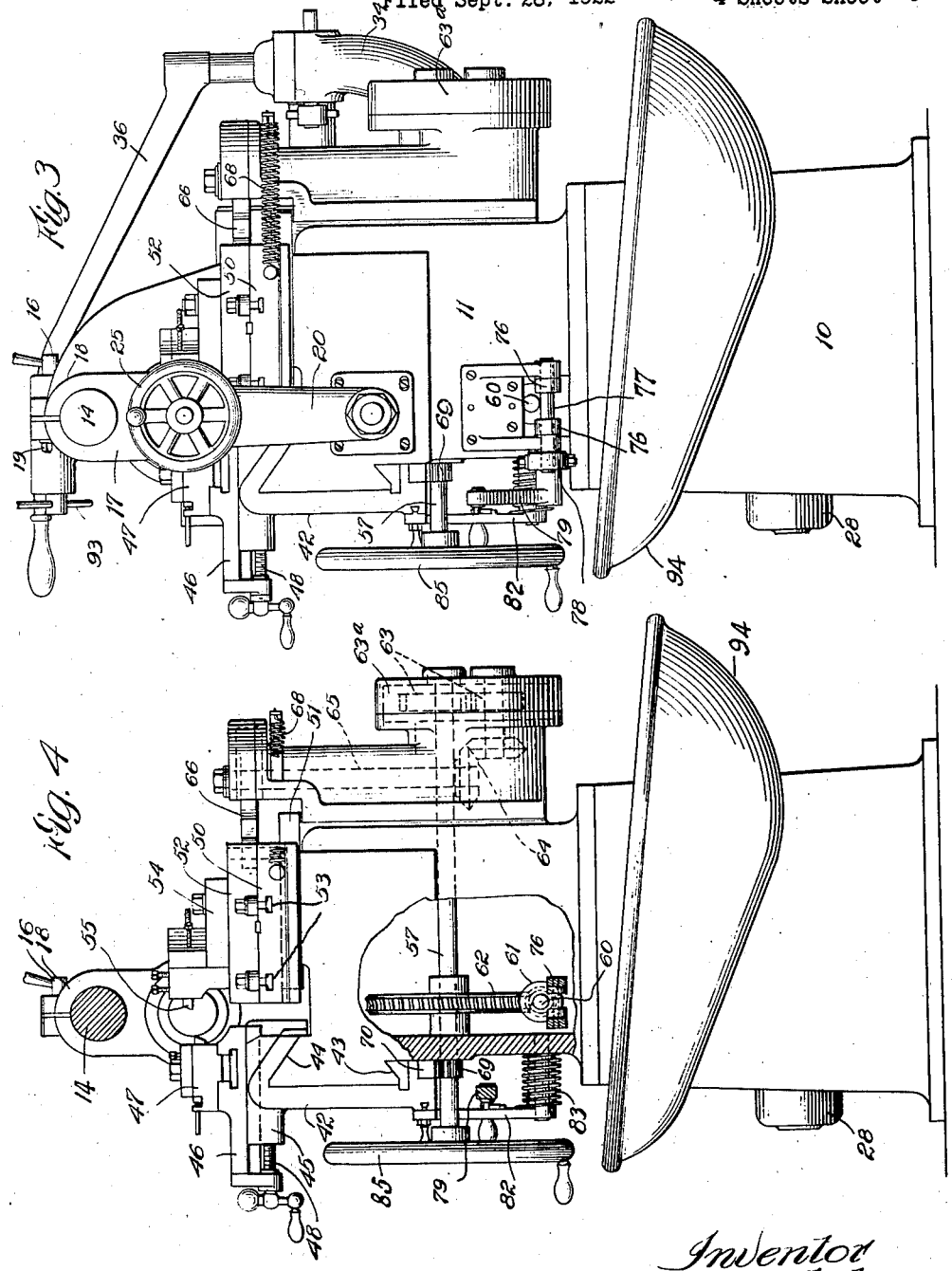

June 5, 1928.
G. D. SUNDSTRAND
LATHE
Filed Sept. 28, 1922 4 Sheets-Sheet 4
1,672,475
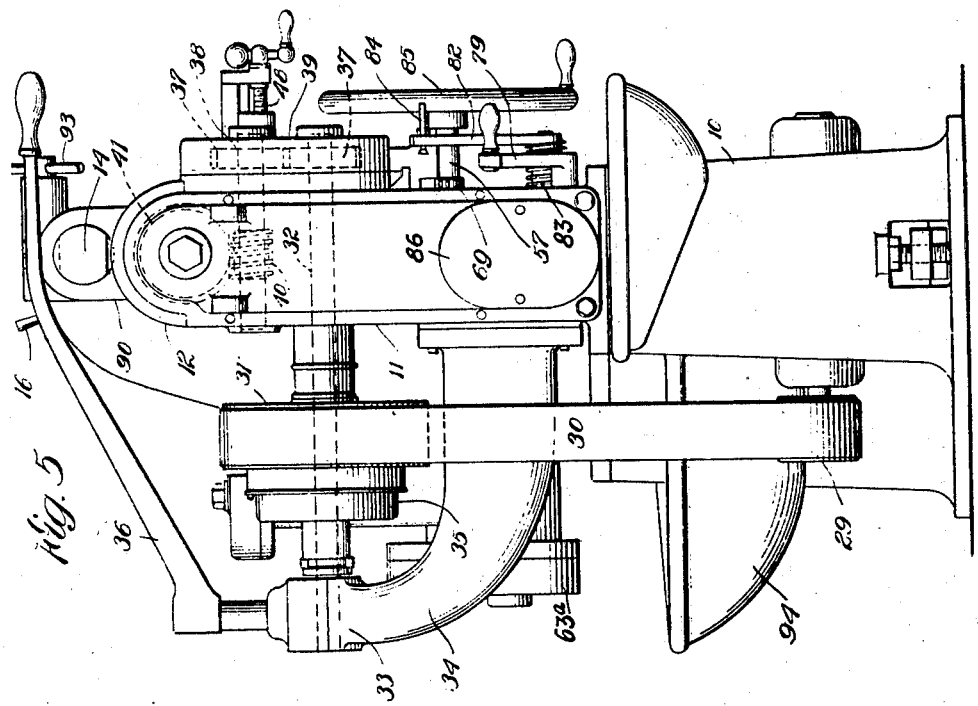
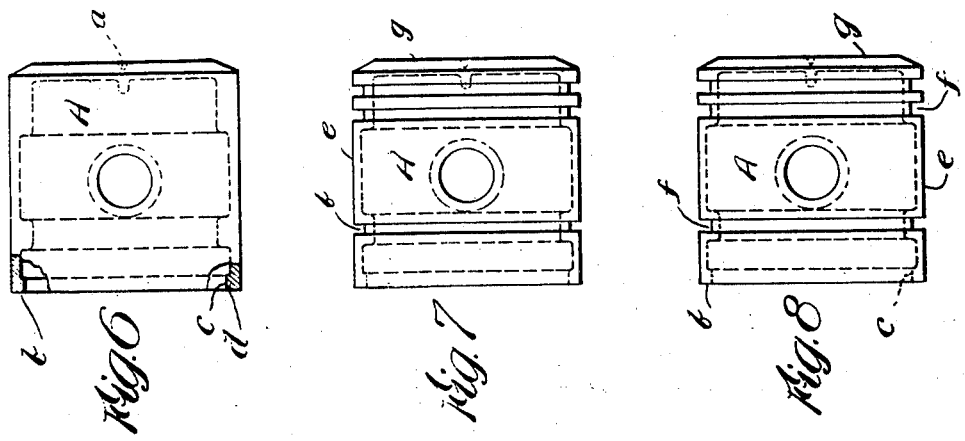
Inventor
G. D. Sundstrand Patented June 5, 1928.

1,672,475

UNITED STATES PATENT OFFICE.

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS.

LATHE.

Application filed September 28, 1922. Serial No. 591,038.

This invention relates to machine tools and has particular reference to machines used in the manufacture of parts requiring a substantial amount of machine work, such, for example, as pistons for internal-combustion engines, pulleys and small fly wheels, gear blanks, bushings and rings of various types, universal joint crosses, sprockets, ball and socket joints, etc.

The object of my invention, generally stated, is to produce a machine tool in the nature of a lathe, of such construction and arrangement that a large number of operations may be performed upon the work simultaneously and with increased facility, thus increasing the efficiency of the manufacturing operation.

For purposes of illustration, I have shown and will hereinafter describe my invention as embodied in a lathe employed in the manufacture of pistons. These are customarily supplied to the machine shop in the form of rough castings and it is necessary in machining a piston to turn its outer periphery, to face its opposite ends, to turn the inner peripheral surface of the skirt, to form the grooves which are to receive the piston packing rings, and in some instances, to form a recess centrally of the closed end of the piston to facilitate the mounting of the same in the lathe for certain operations, and in a grinding machine for the final operation. Heretofore, it has been the practice to perform the several machining operations in lathes essentially of standard construction. Consequently numerous separate operations have been necessary so that a great deal of time and labor has been consumed in positioning and removing the pistons from the lathe before and after each operation.

Another object of my invention is to produce a lathe in which the several operations may be economically performed in the order and manner which a particular manufacturer may prefer.

Further objects of the invention are to produce a machine having the parts very compactly arranged so that it will occupy a minimum amount of floor space; to provide a construction such that the work may be firmly supported in the lathe; to provide simple means for effecting the necessary changes in speeds; to combine the driving mechanism so that the whole is almost entirely enclosed, thus forming a self-contained machine; and finally, to attain a high degree of simplicity in construction and convenience in the arrangement of parts.

In the accompanying drawings, I have illustrated but one embodiment of the invention. It is contemplated, however, that various changes in the form, construction and arrangement of parts may be made by those skilled in the art, but without departing from the spirit and scope of the invention as expressed in the appended claims.

Figure 1 of the drawings is a front elevational view of my improved lathe. Fig. 2 is a plan view of the same the overarm being broken away. Fig. 3 is an end elevational view. Fig. 4 is a similar view but with parts broken away to show details of construction. Fig. 5 is an elevational view of the left hand end of the machine. Figs. 6, 7 and 8 are side views of a piston illustrating the various steps in the manufacturing operation.

The embodiment of the invention herein shown comprises a hollow base 10 upon which is supported at one end a body of substantial height, forming in effect a column of which the lower or main portion 11 constitutes a bed and the upper portion 12 forms a stationary head-stock. A work supporting spindle 13 is journalled in the upper portion or headstock, and above the spindle is mounted a shaft 14 which extends longitudinally over the bed, forming an overarm. The extreme upper end of the column is provided with a split bearing 15 (Fig. 2) having clamping bolts 16, whereby the overarm may be rigidly held in position.

At the opposite end of the bed, I provide a tailstock 17 which is so mounted as to constitute a connection between the overarm and the lathe bed. To this end the upper portion of the tailstock has a split bearing 18 having clamping bolts 19. The tailstock also has a depending portion 20 having a sleeve 20ª which is mounted upon a stud 21 carried by the lathe bed 11. The stud 21 extends parallel with the overarm. In some instances the tailstock is secured in position by a nut 22 and spacing collars 23, the collars being placed at either side or at each side of the sleeve 20ª, depending upon the desired spacing of the tailstock from the headstock. In other instances the collars are removed to permit of the movement of the tailstock by the overarm as hereinafter set forth. The construction while providing an effectual support for the tailstock also provides a support for the free end of the overarm. The tailstock is provided with a center 24 (Fig. 2) adjustable in the usual way by means of a hand wheel 25 and arranged to be locked by the clamping screw 26 (Fig. 1).

The spindle 13 of the headstock may be provided with suitable means for holding the work A. In Fig. 1, I have shown an internal chuck 27 which is especially adapted to hold a piston. It will be understood, however, that if desired, the work may be supported between the center 24 of the tail stock and a corresponding centering chuck (not shown) on the spindle.

Enclosed within the base 10 is an electric motor 28 which I prefer to employ as the source of power. A pulley 29 on the motor shaft projects a short distance from the rear side of the base and is connected by means of a belt 30 with a pulley 31 on a transverse shaft 32 mounted at one end in the column and at its other end in a bearing 33 (Fig. 5) carried at the upper end of a rearwardly and upwardly extending arm 34. A suitable clutch 35 is arranged to be actuated by a control member 36 to effect connection between the pulley 31 and the shaft 32. This clutch and its controlling means forms per se, no part of the present invention, and hence, is not particularly set forth. It will be observed, however, that the control member is so arranged as to extend forwardly over the headstock within convenient reach of the operator stationed at the forward side of the machine.

The means for transmitting power applied to the transverse shaft 32, to the spindle 13 herein comprises a pair of intermeshing gears 37 (Fig. 5), one of which is fastened upon the forward end of the shaft 32 and the other of which is fixed to a parallel shaft 38 also mounted in the headstock above the shaft 32. The column has a detachable gear case 39 upon its forward side which encloses the gears 37. This construction permits of the changing of the gear ratio to vary the speed of the spindle when desired. The shaft 38 carries a worm 40 within the column meshing with the worm wheel 41 which is fastened upon the spindle 13. It will be seen that with the exception of the belt and its pulleys the means for transmitting power from the motor is wholly contained within the housing provided by hollow base and column.

I have provided a front tool carriage movable longitudinally of the lathe bed in a direction parallel to the spindle, and a rear tool carriage movable transversely of the bed in a direction substantially perpendicular to the path of movement of the front carriage. I also utilize as a tool support the overarm 14 as hereinafter set forth.

The longitudinally movable front tool carriage is indicated at 42 (Fig. 1). It is of the apron type, mounted upon the ways 43 and 44 (Fig. 4) and carrying a table 45 upon which a saddle 46 is transversely movable. The latter in turn supports a tool holder 47 for longitudinal adjustment, and the saddle 46 is adjusted transversely by means of a manually operable screw 48. The tool holder may be of any preferred construction, being herein shown (Fig. 2) as equipped with two tools 49 which are adapted in the longitudinal movement of the carriage to turn the outer periphery of the piston.

The transversely movable or rear tool carriage is designated by the numeral 50 (Fig. 4). This carriage is mounted upon transverse ways 51 formed upon the upper side of the lathe bed and carries a table 52 adjustable longitudinally in grooves 53. The table in turn carries a tool holder 54 of suitable construction equipped with tools 55, 56, and 56ª (Fig. 2). In the transverse movement of the carriage 50, the tools 55, 56 and 56ª form the piston ring grooves and face the opposite ends of the piston.

The means for moving the carriages 42 and 50 are actuated from a common drive mechanism including a shaft 57 (Fig. 4) mounted transversely in the bed and operatively connected with the spindle 13 by means of a chain and sprocket connection 58 (Fig. 1), change speed gears 59, a shaft 60, a worm 61, and a worm wheel 62, the latter being fast on the shaft 57.

The means for moving the carriage 50 comprises a pair of spur gears 63 (Fig. 4), bevel gears 64, and a vertical shaft 65 upon which is mounted a cam 66 (Fig. 2) adapted to engage with a roller 67 carried by the table 52 on the carriage 50. Movement of the carriage in a direction toward the spindle is restrained by a coiled tension spring 68 so that when the cam member 66 in its rotation becomes disengaged from the roller 67, the carriage is returned to its rear or initial position. Upon its rear side the column has a gear case 63ª enclosing the gears 63 and detachable to render it possible to vary the speed of the feed mechanism for the carriage 50 as desired.

The means thus provided for imparting transverse feeding movements to the carriage is of an advantageous character because the rotation of the cam in a horizontal plane renders it unnecessary to provide an opening in the base to accommodate the cam, thereby weakening the construction. Also the cam as thus arranged renders a compact construction possible. The cam it will be noted, engages with the carriage substantially at the center line of the latter thereby avoiding any tendency to set up twisting or binding stresses which cause wear upon the ways and are detrimental to the accuracy of the machine.

The carriage 42 (Fig. 4) is actuated from the shaft 57 through the medium of a pinion 69 and rack 70. The pinion is fastened upon the shaft 57 upon the forward side of the column 11 and meshes with the rack which is fixed upon the under side of the carriage 42. A block 71 (Fig. 1) is mounted for longitudinal adjustment at the lower end of the carriage 42 in a groove 72 and has a forwardly projecting pin 71ª arranged to engage with a means for stopping the feeding operation at a predetermined point in the travel of the carriage which means will now be described.

Referring to Figs. 1 and 4, the shaft 60 carrying the worm 61 is connected with a shaft 73 which carries one of the change speed gears 59 through the medium of a universal coupling 74; and the free end of the shaft 60 carries a bearing member 75 mounted upon a pair of spaced levers 76 (Fig. 4) fastened upon a shaft 77. Said shaft carries a crank arm 78 with which is rigid a lever 79 extending upwardly and longitudinally to a point centrally of the lathe (Fig. 1). It will be seen that the weight of the lever 79 plus the weight of the shaft 60, worm 61 and bearing 75, will tend to move the worm out of engagement with the worm wheel 62. Normally it is supported in such engagement with the wheel 62 by means of a pin 80 projecting forwardly from the lever 79 and bearing upon a lug 81 which is formed upon a lever 82 pivotally mounted upon the forward side of the lathe bed. A coiled torsion spring 83 normally holds the lug 81 under the pin 80, but the upper end of the lever is arranged to be engaged by the pin 71ª carried by the block 71 on the carriage 42, whereby to move the lug 81 from beneath the pin 80 and effect the release of the worm 61 from the wheel 62. The lever 82 is provided near its upper end with a handle 84 by means of which it may be manually operated to disengage the worm 61 from its wheel.

For the purpose of manually adjusting the carriage 42, the shaft 57 carries at its forward end a hand wheel 85. Such manual adjustment is effected independently of the feed mechanism after disengaging the worm from the worm wheel as just described.

The change speed gears 59 (Fig. 1) are enclosed within a gear case 86 removably mounted upon the column at the left hand end thereof. Consequently, the speed at which the feed mechanism is driven may be readily varied at will.

The means for supporting a tool or tools from the overarm 14 may be of any suitable character. Thus it may comprise a bracket having a split bearing 87 (Fig. 1) arranged to be clamped upon the overarm by a bolt 88. A tool 89 may be secured to this bracket in any suitable way.

For adjusting and feeding the tool 89, the overarm 14 is rendered capable of longitudinal adjustment in its bearings 15 and 17. To this end one side face of the overarm is flattened and provided with gear teeth 90 with which a pinion 91 fastened upon a shaft 92 is arranged to mesh. For convenience in rotating the shaft 92 it may be provided with a cross rod 93. When the tool has been adjusted through the operation of the shaft 92, it will, of course, be locked in position by the clamp devices 16. When desired, the tailstock 17 may also be adjusted by moving the overarm 14, it being understood that the spacing rings 23 on the shaft 21 are removed for this purpose.

For the purpose of collecting oil, chips and the like, I provide a pan 94 partially surrounding the machine and preferably formed integral with the base at its upper end.

While the different operations upon the piston may be performed in any desired manner, a preferred method of procedure is as follows, reference being made to Figs. 6 to 8, showing the piston A in successive stages of machining:

The first group of operations include the forming of the center recess $a$ (Fig. 6) in the closed end of the piston, facing the opposite open end $b$ of the piston and finishing the inner periphery $c$ of the skirt $d$. The piston, in this instance is placed upon the chuck 27, and a boring bit 95 (Fig. 1) clamped in the tailstock in the place of the center 24, is fed in a direction toward the closed end of the piston sufficiently to form a recess of the desired depth. The tailstock thus is converted into a tool holder. At about the same time, the tool 89 carried by the overarm 14 is moved into engagement with the open end of the piston so as to finish the inner periphery of the skirt; and the tool 56ª (Fig. 2) carried by the rear tool holder 54 is fed so as to face the open end of the piston. In the next or second setting (Fig. 7) the work is supported between a suitable chuck and the center 24 (Fig. 2), said center replacing the boring bit 95. The outer periphery $e$ of the piston is now turned by the engagement of the tools 49 moved longitudinally by the feeding mechanism for the carriage 42; the grooves $f$ for the piston packing rings are formed by the three tools 55 carried by the tool holder upon the rear carriage 50, the movement of these tools to form the grooves of the desired depth being effected through the adjustment of the table 52 with reference to the cam 66; and the tool 56 also carried by the tool holder 54 operates to face the closed end *g* of the piston.

In the second group of operations, the surfaces are cut roughly so that a third group of finishing operations (see Fig. 8) is necessary before the piston is ground. These are performed in the same manner as the case of the second group except that the tools are set to make a finishing cut.

In the manufacture of articles, such as pistons, in large quantities, it is found more economical to employ a number of machines, each performing a certain operation. With the division of the several operations into three main groups or settings, as above set forth, three lathes only need be employed. After the third operation a final finishing or grinding operation is performed in a suitable grinding machine.

It will be apparent that since the number of operations which may be performed simultaneously in one machine is increased the number of machines required for the manufacture of the article in quantities, and hence the cost thereof and the floor space required, is greatly reduced. Moreover the saving in time which is effected by reason of the elimination of waste of time in placing the work in one machine and removing it therefrom in connection with each operation, is very great.

As to construction, it will be apparent that the machine is of extreme simplicity, and yet it embodies a highly advantageous arrangement of the parts and is well adapted for the especial use to which it may be put. Moreover, the parts are so compactly arranged that the machine occupies a minimum amount of floor space.

Thus, it will be noted that the elevation of the spindle and tool holders renders it unnecessary for the attendant to stoop or bend over the machine. The controlling devices are also located conveniently with respect to the attendant stationed at the front of the machine.

I deem the use of an overarm in a lathe to be of substantial importance in that it enables the performance of heavy work without any undue strain and with a high degree of accuracy.

I also believe that I am the first to have utilized an overhanging arm in a lathe for the purpose of carrying cutting tools, the arm being adjustable for the purpose of properly positioning the tools as well as to move the tailstock.

The construction, moreover, is such that an exceedingly compact machine tool is produced occupying a minimum amount of space and the enclosure of the major portion of the drive mechanism is also advantageous.

I claim as my invention:

1. A lathe having, in combination, an upright body providing a bed, a headstock at one end of the bed and a tailstock at the other end of the bed, means carried by said headstock and said tailstock for rotatably supporting the work, a front tool carriage mounted on the forward side of the body for movement parallel to the axis of the work, a rear tool carriage mounted on said bed for movement transversely of the work, driving means, and means providing operative connections between said driving means and said carriages to move them and including a trip mechanism operable to interrupt the travel of the front tool carriage at the end of a predetermined movement thereof, the connection between said driving means and the rear tool carriage including a cam mounted to turn on an upright axis and operatively engaging with the carriage near the rear end thereof, said cam being adapted to impart a single full feeding stroke to the rear tool carriage during a full feeding stroke of the front tool carriage mechanism.

2. In a lathe, the combination of means for rotatably supporting and driving the work, a tool carriage mounted for movement transversely of the axis of the work, a second tool carriage mounted for movement parallel to the axis of the work, driving means for actuating said tool carriages including a shaft having connections with the respective carriages, the connection between the shaft and the rear tool carriage including a cam mounted to turn in the horizontal plane of the rear tool carriage and operatively associated therewith, and trip mechanism for interrupting the operation of said driving means, said cam being adapted to impart a full feeding stroke to the rear tool carriage during a full feeding stroke to the front tool carriage.

3. A lathe having a bed, a headstock at one end of the bed, a tailstock on the other end of the bed, a front tool carriage mounted on the bed for movement longitudinally thereof, a rear tool carriage mounted for transverse movement upon the bed, means carried by the headstock and the tailstock for rotatably supporting the work, and means for feeding said carriages to carry cutting tools thereon simultaneously into engagement with the work, the means for feeding the rear tool carriage including a rotary cam adapted at a predetermined point in the rotation thereof to effect an interruption of the feed and a withdrawal of the rear tool carriage away from the work.

4. A lathe having a spindle adapted rotatably to support the work, an overarm, and a tailstock secured to said overarm and adapted to support a cutting tool for engagement with the work.

5. A lathe having a spindle adapted rotatably to support the work, an overarm, means acting upon said overarm to move it, and a tool support movable with the overarm.

6. A lathe comprising, in combination, a bed, a headstock rigid with one end of the bed, a front tool carriage mounted on the forward side of the bed and adapted for movement past the headstock, an overarm carried by the headstock, a tailstock on the overarm, a tool support on said carriage, and means for imparting a feeding movement to said carriage.

7. In a lathe, a column including a bed, an overarm mounted in the column, and a connection between the overarm and the bed comprising a tailstock mounted on the bed and having a bearing for receiving the overarm.

8. A lathe having a column, a spindle journalled near the upper portion of the column and extending longitudinally of the lathe, a carriage, means for moving the carriage including a shaft mounted in the lower portion of the column, means providing a change speed gearing connection between said spindle and said shaft including a second shaft parallel with the first shaft and connected with the spindle, and a pair of intermeshing gears connecting said two shafts, and a housing detachably secured to the column for enclosing said gears.

9. A lathe having a hollow bed, a carriage mounted to slide transversely of the bed, means for moving the carriage including a shaft mounted transversely of the bed, a cam adapted to move the carriage, a vertically disposed shaft having said cam thereon, means operatively connecting said shaft with the first mentioned shaft including a pair of intermeshing gears, and a detachable gear case for enclosing said gears.

10. A lathe having a column, a spindle journalled near the upper portion of the column extending longitudinally of the lathe, a transverse shaft extending through the column and projecting rearwardly therefrom, a bracket secured to the rear side of the column and supporting the rear end of the shaft, a pulley mounted on the shaft, a clutch for operatively connecting said pulley with the shaft, a controlling device for said clutch including a lever mounted on said bracket and extending forwardly over the column, and means operatively connecting said shaft with the spindle.

11. A lathe having a headstock, a spindle journaled in the headstock, a shaft mounted transversely below the headstock and projecting rearwardly therefrom, a bracket supported rearwardly of the headstock and providing a support for the rear end of said shaft, a tool carriage operatively connected with said spindle for feeding movement, means including a clutch for driving said shaft, and a lever mounted on said bracket and extending forwardly over the headstock, said lever being operatively associated with said clutch whereby to control the operation of the spindle and the carriage.

12. A lathe comprising, in combination, a bed, a headstock at one end of the bed, a front tool carriage mounted on the forward side of the bed and adapted for movement past the headstock, an overarm carried by the headstock, a tool support carried by the overarm, and means for moving said tool support to feed a tool carried thereby into engagement with the work carried by the headstock.

13. A lathe comprising, in combination, a bed, a headstock, rigid with the bed and rising from one end thereof, a work supporting spindle mounted in the headstock, a front tool carriage mounted on the forward side of the bed, an overarm carried by the headstock above the spindle, a tailstock connecting the opposite end of said bed with the overarm, a rear tool carriage mounted for transverse movement on the bed, and means for simultaneously feeding the front and rear tool carriages.

14. A lathe comprising, in combination, a bed, a headstock rigid with the bed and rising from one end thereof, a work supporting spindle mounted in the headstock, a front tool carriage mounted on the forward side of the bed, and overarm carried by the headstock above the spindle, a tailstock connecting the opposite end of said bed with the overarm, a rear tool carriage mounted for transverse movement on the bed; a tool support carried by the overarm, means for imparting feeding movements to the front and rear tool carriages, and means for imparting a feeding movement to said tool support.

15. A lathe constructed to provide a rigid rectangular frame comprising a bed, a headstock, an overarm and a tailstock, means carried by the head and tailstocks for rotatably supporting the work, and a plurality of tool supports mounted on the bed and the overarm and adapted to carry their tools simultaneously into engagement with the work.

16. A lathe having a bed, a headstock rigid with and rising from one end of the bed, a tailstock connected to the other end of the bed, an overarm connecting the headstock and the tailstock above the bed, a front tool carriage mounted on the bed for movement longitudinally thereof, a rear tool carriage mounted for transverse movement upon the bed, means carried by the head and tail stocks for rotatably supporting the work, and means for feeding said carriages to carry cutting tools thereon simultaneously into engagement with the work.

17. A lathe having a bed, a headstock rigid with and rising from one end of the bed, a tailstock connected to the other end of the bed, an overarm connecting the headstock and the tailstock above the bed, a front tool carriage mounted on the bed for movement longitudinally thereof, a rear tool carriage mounted for transverse movement upon the bed, means carried by the head and tailstocks for rotatably supporting the work, means for feeding said carriages to carry cutting tools thereon simultaneously into engagement with the work, a third tool support carried by the overarm, and manually operable means for feeding a tool on said support into engagement with the work.

18. A lathe having a bed, a headstock rising from one end of the bed, a work supporting spindle journaled in the headstock, a tool carriage mounted for movement to carry a tool thereon into engagement with the work supported by said spindle, mechanism for imparting a feeding movement to said carriage, an overarm mounted in the headstock, a tool support carried by the overarm, and manually operable means for feeding a tool on said support into engagement with the work.

19. A lathe having a bed, a headstock rising from one end of the bed, a work supporting spindle journaled in the headstock, a tool carriage mounted for movement to carry a tool thereon into engagement with the work supported by said spindle, mechanism for imparting a feeding movement to said carriage, an overarm mounted in the headstock, a tailstock on the overarm adapted to support a tool for movement into engagement with the work, and manually operable means for feeding said tool.

20. A lathe having, in combination, a bed, a headstock on the bed, a spindle in said headstock, an overarm supported above the spindle, a tailstock having in its upper portion an opening through which said overarm extends for supporting the tailstock, said tailstock also having an opening through its lower portion, a stud secured to said bed parallel with the overarm and extending through the last mentioned opening, spacing collars on said stud, and a nut on said stud for clamping said collars and the lower end of the tailstock to the bed.

21. A lathe having, in combination, a headstock, an overarm supported by the headstock, a tailstock having in its upper portion an opening through which said overarm extends for supporting the tailstock, said tailstock also having an opening through its lower portion, a stud secured to one end of the bed parallel with the overarm and extending through the last mentioned opening and means for adjustably securing the lower end of the tailstock in place on the stud.

22. A lathe having, in combination, a bed, a headstock on the bed, an overarm supported by the headstock, a stud fixed to one end of the bed and extending parallel with the overarm, and a tailstock adjustably secured to the overarm and the stud.

In testimony whereof, I have hereunto affixed my signature.

GUSTAF DAVID SUNDSTRAND.